United States Patent [19]

Schnell

[11] 4,219,381
[45] Aug. 26, 1980

[54] METHOD OF TREATING WASTE PAPER FOR OBTAINING A STOCK SUSPENSION FOR THE PRODUCTION OF NEW PAPER AND APPARATUS FOR THE PERFORMANCE OF THE AFORESAID METHOD

[75] Inventor: Hans Schnell, Mengen, Fed. Rep. of Germany

[73] Assignee: Escher Wyss GmbH, Ravensburg, Württemburg, Fed. Rep. of Germany

[21] Appl. No.: 11,780

[22] Filed: Feb. 12, 1979

[30] Foreign Application Priority Data

Mar. 7, 1978 [CH] Switzerland .......................... 2442/78

[51] Int. Cl.² .............................................. D21C 5/02
[52] U.S. Cl. ........................................ 162/4; 162/55; 209/17; 209/616; 209/173; 241/21; 241/28; 241/46 R; 241/46.17; 241/79; 241/78
[58] Field of Search ................. 162/4, 55; 241/28, 21, 241/46 R, 46.17, 79, 78; 209/17, 173, 616

[56] References Cited

U.S. PATENT DOCUMENTS

| | | | |
|---|---|---|---|
| 3,113,733 | 12/1963 | Carlson | 241/68 |
| 3,716,197 | 2/1973 | Craig et al. | 241/46.17 |
| 3,814,336 | 6/1974 | Brewer | 241/46.17 |

Primary Examiner—William F. Smith
Attorney, Agent, or Firm—Werner W. Kleeman

[57] ABSTRACT

A method and apparatus for treating waste paper by pulping or defibering the paper in a stock pulper or slusher while infeeding water, wherein there are removed in succession, externally of the stock pulper, heavy weight particles, floatable substances and plastic foils. Thereafter, paper constituents which have incompletely defiberized are removed and further defibered in a special apparatus. The already defibered fibers are directly infed for further processing. The removal of the contaminants can be accomplished at a suspension density in the order of 1%, whereas the defibering or pulping of the waste paper in the stock pulper occurs at about 4%. The employed sorting apparatus is connected with the stock pulper, while dispensing with the use of a sieve or screen.

12 Claims, 3 Drawing Figures

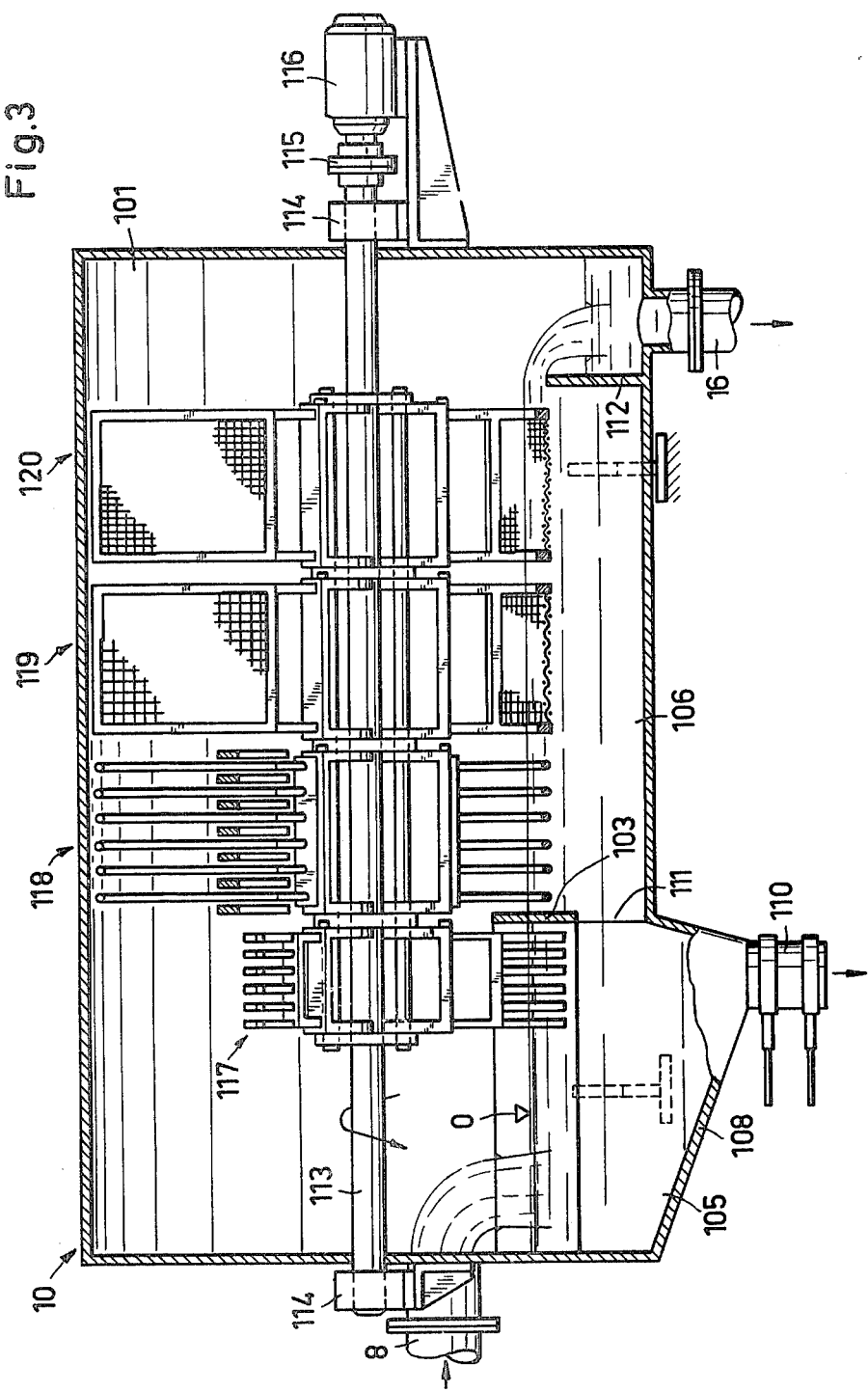

METHOD OF TREATING WASTE PAPER FOR OBTAINING A STOCK SUSPENSION FOR THE PRODUCTION OF NEW PAPER AND APPARATUS FOR THE PERFORMANCE OF THE AFORESAID METHOD

BACKGROUND OF THE INVENTION

The present invention relates to a new and improved method of treating waste paper for obtaining a stock suspension for the production of new paper, and further, relates to novel apparatus for the performance of the aforesaid method.

Heretofore, waste paper, in order to obtain stock suspensions for the fabrication of new paper, has been dissolved in so-called stock slushers or pulpers, and heavy contaminants are eliminated in the pulper. The obtained liquid is removed through a sieve or screen from the stock slusher, refined and cleaned in a number of working operations, and thereafter introduced, for instance, into the tub or vat of a papermaking machine. Apart from the danger of clogging the sieve at the stock slusher, by not completely comminuted plastic particles and plastic foils, this procedure further has the drawback, that with great expenditure of energy, all of the constituents of the waste paper must be comminuted in such a fashion that they are able to pass through the sieve. However, at the same time there is rendered more difficult their separation capability from the suspension. This in turn leads to a large expenditure of energy and equipment costs.

SUMMARY OF THE INVENTION

Generally speaking, it is an aim of the invention to provide a novel method and apparatus, by means of which there can be avoided the danger of clogging of the sieve in the stock slusher or the like, since it is unnecessary to use such sieve. Additionally, the particles which are to be separated-out, especially the floatable plastic particles as well as the foil pieces, need not be excessively reduced in size, so that they can be removed relatively easily from the suspension. Further processing only thereafter entails the incompletely defibered paper particles or constituents. There is thus realized a particular saving in energy, since the treatment in the stock slusher can be shortened, and the post-treatment in only limited to the not yet defibered paper particles or constituents. Additionally, the entire flow of the suspension, emanating from the stock slusher, need not be post-treated in a further refinement stage, for instance a fiberizer or the like. As mentioned, the treatment is limited solely to the non-defibered particles.

Therefore, with the foregoing in mind, it is a primary object of the present invention to provide a novel method of, and apparatus for, obtaining a stock suspension for the production of new paper from waste paper, in a manner which fulfills the afore-mentioned aims of the invention.

The method of the invention for treating waste paper in order to obtain a stock suspension for the fabrication of new paper, wherein the paper is defibered in a stock slusher having a movable defibering or slushing element, while infeeding water, contemplates that the suspension which is formed in the stock slusher and which contains the contaminants as well as the not completely defibered paper parts, has the contaminants removed from the suspension in a flow externally of the stock slusher, the successively removed contaminants being in the form of heavy particles, floating substances and plastic foils. Thereafter, the incompletely defibered paper particles or parts are removed from the remainder of the suspension, these incompletely defibered paper parts are separately further defibered, and the remaining defibered fibers together with the separately defibered fibers are infed as good stock for the further processing into paper. The not completely defibered paper parts can be defibered by applying shear loads.

A preferred construction of apparatus for the performance of the method aspects, contemplates connecting a sorting apparatus to the stock slusher. This sorting apparatus serves to sort the stock suspension formed in the stock slusher into heavy contaminants, floatable contaminants, large-surface contaminants, not completely defibered paper pieces, and fibers which can be used as good stock. The contaminants are eliminated, the not completely defibered paper pieces or parts are eliminated by means of an additional defibering device, and the fibers present in a usable form are directly employed for fabricating paper. The additional defibering device can be constitued by a so-called refiner having mutually movable rows of teeth.

The defibering of the waste paper in the stock slusher preferably occurs at a concentration in a range of about 4%, whereas the removal of contaminants from the suspension occurs in the presence of a stock density in the order of about 1%. Furthermore, it is possible to infeed the water needed for defibering the waste paper into the flow of the suspension following the stock slusher, however prior to the removal of the contaminants, and the fibers which can be used as good stock likewise are removed from the flow and infed for further use, whereas the remaining liquid is infed into the defibering container. By virtue of these measures both the defibering of the waste paper and the sorting can be carried out at optimum concentration conditions.

Moreover, the sorting apparatus advantageously may be of the type disclosed in my commonly assigned, U.S. application, Ser. No. 11,779, filed Feb. 12, 1979, entitled "Sorting Apparatus For A Stock Suspension Obtained From Waste Paper," to which reference may be readily had and the disclosure of which is incorporated herein by reference. It should be however understood that also different devices can be employed at this point of the system, provided that they fulfill the conditions of the method.

The sorting apparatus can comprise a sorting container connected with the stock slusher, and through which leads the flow of the suspension formed in the stock slusher or pulper. In the sorting container there is a chamber for the separation of heavy contaminants and floatable contaminants, and at least one chamber equipped with rakes and sieves of different fineness for eliminating surface-like contaminants which are insoluble in water, incompletely defibered paper parts as well as good stock.

By virtue of these features of the sorting apparatus there can be beneficially realized the result that, for instance, foil parts, exposed to the separate further defibering or slushing action in conjunction with the not completely defiberd paper parts, and thus markedly reduced in size, do not arrive at the good stock.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 is a schematic sectional view of the sorting apparatus used in the arrangement of FIG. 1.

DETAILED DESCRIPTION OF THE PREFERRED EMBODIMENTS

Figure 1:
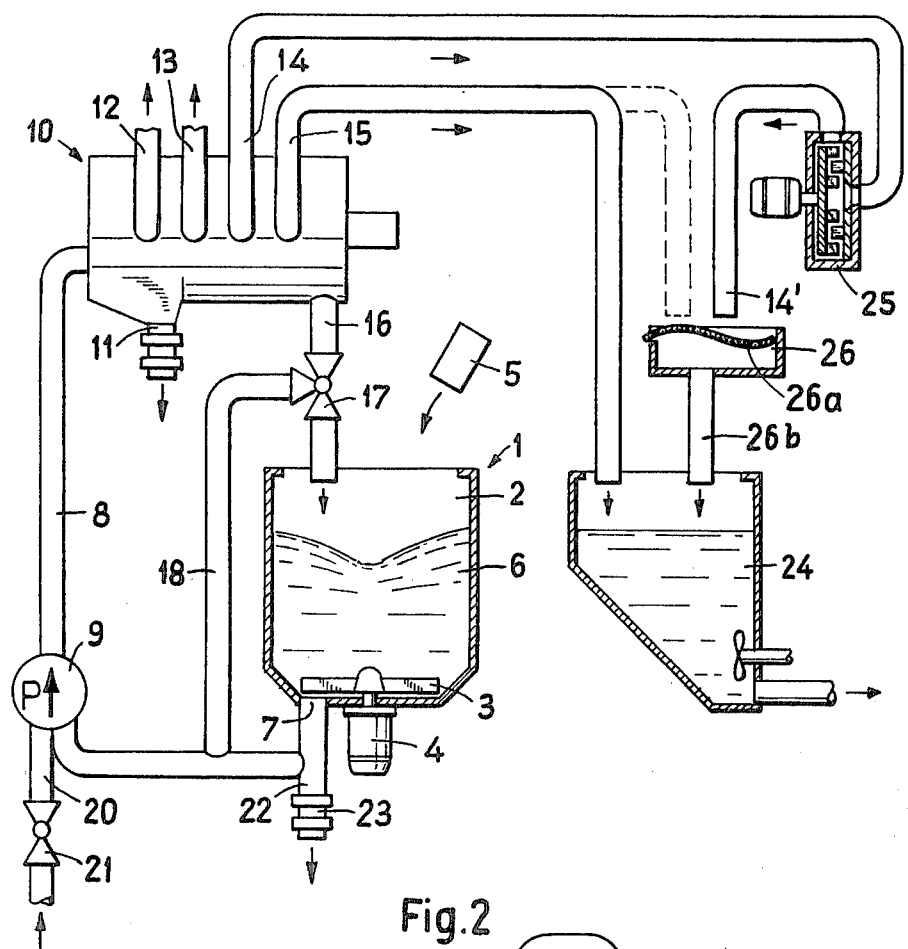
FIG. 1 schematically illustrates apparatus constructed according to the invention and suitable for practice of the method aspects.

Describing now the drawings, the equipment illustrated in FIG. 1 will be seen to comprise a stock slusher or pulper 1 having a container 2 at the base of which there is rotatably mounted a rotor 3 driven by a suitable drive motor 4. Bales 5 of waste paper are thrown into the container 2. The bales 5 of waste paper or the like are defibered in the water filling 6 of the container 2, under the action of the rotor 3, constituting a defibering or slushing element. At the base region of the container 2 there is arranged an outlet opening 7, from which leads a connection conduit or line 8, equipped with a pump 9, to a sorting apparatus 10. The sorting apparatus 10, which will be described more fully hereinafter based upon the showing of FIG. 3, has an outlet 11 for heavy weight contaminants, also referred to as heavy contaminants, an outlet 12 for floatable contaminants, for instance foamed plastics or wood, an outlet 13 for non-defiberizable suspendible contaminants, such as for instance plastic foils, an outlet 14 for not completely defibered paper parts or particles, and an outlet 15 for completely defibered or removed paper fibers, constituting the good stock, and contained in the suspension. The water which flows through the sorting apparatus 10, and from which there are removed the constituents by the outlets 11 to 15 as explained above, arrives by means of an outlet line or conduit 16 having a three-way valve 17 or equivalent structure, either again in the stock slusher 1 or in a recirculation line or conduit 18 opening into the connection line or conduit 8. A water line 20 having a suitable valve 21 opens into the line or conduit 8, and specifically forwardly of the pump 9 which can be designed as a mixing pump. This line 8 is provided with a pocket or removal means 22 for separating the heaviest contaminants, and these contaminants can be removed from the pocket 22 by a suitable discharge device 23, for instance a sluice.

Figure 2:
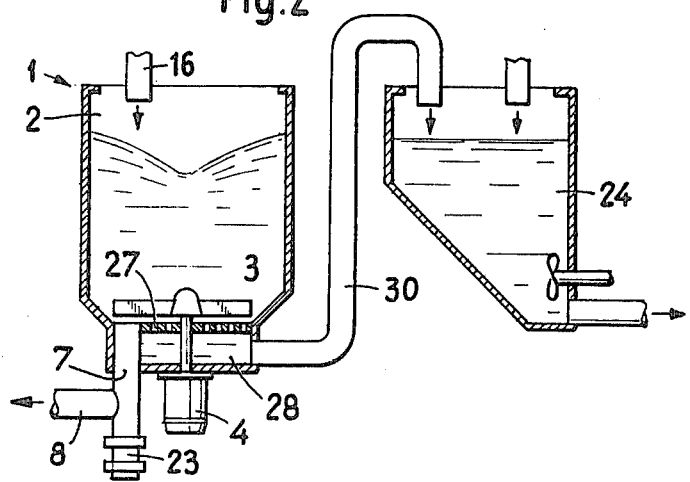
FIG. 2 is a sectional view of the arrangement of FIG. 1, showing a modification of the equipment depicted therein.

At the right-hand part of FIG. 1 there is shown the tub or vat 24 of a papermaking machine from which the obtained good stock can be delivered to the papermaking machine. The line forming the outlet 15 leads directly into this tub or vat 24. The line forming the outlet 14 leads into a refining or conditioning device 25 which, as is well known in this technology, has concentric mutually interengaging rows of teeth which have not been here particularly referenced but shown, such teeth rows moving past one another, whereas the stock suspension or liquid can be conducted through the tooth gaps of the teeth rows. Consequently, the stock liquid or suspension is subjected to an increased shearing load, which not only contributes to defibering of the incompletely defibered paper parts, but also to refining or conditioning of the stock suspension. Such type refiners are known to the art, for instance, from U.S. Pat. No. 4,011,027, granted Mar. 8, 1977. The stock suspension moves out of the refiner or refining device 25, through a line or conduit 14', into a dynamic jarrer or vibrator 26 which, as is well known, contains a movable sieve or screen, generally indicated by reference character 26a. This sieve 26a is pervious to the suspension fibers and the suspension liquid, but however, holds back pieces of plastic foil and similar large parts or particles. The stock liquid, purified by the dynamic vibrator 26, likewise is infed to the tub or vat 24 by means of the line 26b. In accordance with the modified showing of FIG. 2, it is also possible with the apparatus of the invention to retain, in addition to the inventively contemplated sieve-free outlet opening 7, also the previously employed sieve or screen 27. Flowing through this sieve 27, which in fact can be finer than sieves heretofore employed at such location, is the good stock which then arrives at a collecting chamber or compartment 28, from which it can be infed, by means of a line or conduit 30, directly into the tub or vat 24.

FIG. 3 illustrates in schematic sectional view a possible construction of the sorting apparatus 10, as the same has been proposed in greater detail in the afore-mentioned copending application.

According to the showing of FIG. 3 the sorting apparatus 10 will be seen to comprise a housing 101 which is divided by the partition wall 103 into a front separation container 105 and a subsequently arranged separator or segregating container 106. The separation container 105 is connected with the connection line or conduit 8 for the infeed of the stock suspension. This separation container 105 has an inclined floor or bottom 108, at the lowest location of which there is arranged a suitable discharge device 110, for instance a sluice, for the removal of heavy contaminants. The separation container 105 is connected by an opening 111 with the separator container 106, this opening 111 being formed in the partition wall 103 and being located below the liquid level O of the stock suspension or liquid contained in both of the containers 105, 106. The separator container 106 terminates by means of a vertical wall 112 over which flows the liquid, whereafter it arrives at the outlet line or conduit 16.

Extending in the lengthwise direction of the housing 101 is a shaft 113 which is rotatably mounted in bearings 114 and connected by means of a coupling 115 with a gearing motor 116 or other suitable drive. Upon the shaft 113 there are arranged the removal devices 117, 118, 119 and 120.

The removal device 117, which for instance can be designed in the illustrated matter in the fashion of a rotatable rake, and serves for the removal of the floating substances or particles which float at the surface O of the liquid located in the separation container 105.

The removal devices 118, 119 and 120 are arranged in tandem within the separator container 106, with respect to the direction of flow of the stock suspension or liquid through the containers 105 and 106. The removal device 118, which likewise can have the construction or shape of a rake, serves for the removal of floating, large surface particles from the stock suspension and which are not soluble in water. These contaminants can be for instance plastic foils, textile pieces, ropes or cords and so forth. The removal device 119 which contains a coarse-mesh sieve and rotatable in conjunction with the shaft 113, serves for the removal of lumps of waste paper from the stock liquid or suspension and which have not yet been completely defibered. Finally, the removal device 120 serves for the removal of good stock fibers out of the last section of the separator container 106, whereby such is concentrated and partially dewatered. The removal device 120 can contain for this purpose a relatively fine-mesh sieve, which is arranged at the rotatable shaft 113 and is rotatable along therewith.

From these removal devices 117, 118, 119 and 120, the removed material can be brought in a suitable fashion, for instance by means of a not particularly shown propelling or ejector mechanism, to a catch container located near to the sorting apparatus, and as explained in greater detail in my afore-mentioned commonly assigned, copending application.

The inventive equipment is associated with the decisive advantage that the defibering of the paper in the stock slusher 1 and the sorting operation in the sorting apparatus 10 can be accomplished with different concentrations of the fiber suspension. Thus, for instance, for the defibering of the waste paper there has been found to be most advantageous a fiber stock concentration in the order of 4%, whereas for the sorting operation there has been found that it is most advantageous to carry out the same with a fiber stock concentration of about 1%. This is predominantly achieved in that the larger part of the water emanating from the sorting apparatus 10 is circulated through the recirculating line 18, and does not reach the stock slusher 2. The water which is to be added arrives initially from the line or conduit 20 at the sorting apparatus 10, which operates with large water quantities and firstly thereafter arrives at the stock slusher 1.

While there are shown and described present preferred embodiments of the invention, it is to be distinctly understood that the invention is not limited thereto, but may be otherwise variously embodied and practiced within the scope of the following claims.

Accordingly, what I claim is:

1. A method of treating waste paper for obtaining a stock suspension for fabricating new paper, comprising the steps of:
    forming a stock suspension in a stock slusher by infeeding waste paper and water into said stock slusher;
    said stock suspension containing contaminants and not completely defibered paper parts;
    withdrawing and removing in succession, outside of the stock slusher, the contaminants from the flow of the stock suspension in the form of heavy particles, floatable substances and plastic foils;
    removing paper fibers from the stock suspension;
    removing from the remainder of the suspension incompletely defibered paper parts;
    further defibering the removed incompletely defibered paper parts; and
    feeding the paper fibers removed from the stock suspension together with the fibers obtained from the incompletely defibered paper parts as good stock for further processing into paper.

2. The method as defined in claim 1, wherein:
    the incompletely defibered paper parts are defibered by applying a shear load.

3. The method as defined in claim 1, further including the steps of:
    accomplishing the defibering of the waste paper in the stock slusher at a concentration in the order of about 4%; and
    accomplishing removal of the contaminants from the suspension with a stock density in the order of about 1%.

4. The method as defined in claim 1, further including the steps of:
    infeeding the water needed for defibering the waste paper to the flow of the suspension at a point following the stock slusher, but prior to the removal of the contaminants;
    removing from the flow of the stock suspension, after the removal of the contaminants, the fibers which can be used as good stock and delivering such for further use to form new paper; and
    infeeding the remainder of the stock suspension into a defibering container of the stock slusher.

5. An apparatus for treating waste paper in order to obtain a stock suspension for the fabrication of new paper, comprising:
    a stock slusher for defibering waste paper within which the waste paper is mixed with water in order to form a stock suspension;
    a sorting apparatus operatively connected with said stock slusher;
    said sorting apparatus incorporating means for sorting the stock suspension formed in the stock slusher into heavy contaminants, floatable contaminants, large-surface contaminants, not completely defibered paper pieces and fibers which can be used as good stock;
    the sorting means containing structure for separating out the contaminants;
    an additional defibering means for receiving the not completely defibered paper pieces; and
    means for receiving the fibers which are ready to be directly used and which have been separated out as good stock so that such received fibers can be directly employed for the paper fabrication.

6. The apparatus as defined in claim 5, wherein:
    the additional defibering means comprises a refiner having mutually moveable rows of teeth.

7. The apparatus as defined in claim 5, wherein:
    said sorting apparatus has inlet means connected with a water line and outlet means for water of the stock suspension; and
    the water of the stock suspension which effluxes out of the sorting apparatus by means of said outlet means being infed into the stock slusher.

8. The apparatus as defined in claim 5, further including:
    inlet means for the stock suspension and outlet means for the water of the stock suspension provided for said sorting apparatus; and
    recirculation line means for operatively connecting the outlet means of said sorting apparatus with its inlet means.

9. The apparatus as defined in claim 5, wherein:
    said stock slusher has an outlet means;
    means for connecting the sorting apparatus with the outlet opening of the stock slusher while avoiding the use of a sieve.

10. The apparatus as defined in claim 5, wherein:
    said sorting means of said sorting apparatus comprises a sorting container which flow communicates with the stock slusher and through which flows the stock suspension formed in the stock slusher;

said sorting container including a compartment for separating the heavy contaminants and floatable contaminants;

said container further including a compartment provided with rake means and sieve means having different mesh fineness for the successive separation of the large-surface contaminants which are insoluble in water, the not completely dissolved paper pieces and good stock.

11. The apparatus as defined in claim 6, further including:

dynamic vibrator means arranged after said refiner.

12. A method of treating waste paper for obtaining a stock suspension for fabricating new paper, comprising the steps of:

forming a stock suspension in a stock slusher by infeeding waste paper and water into said stock slusher;

said stock suspension containing contaminants and incompletely defibered paper parts;

withdrawing and removing in succession, outside of the stock slusher, the contaminants from the flow of the stock suspension in the form of heavy particles, floatable substances and large-surface contaminants which are insoluble in water;

removing fibers from the stock suspension;

removing from the remainder of the suspension incompletely defibered paper parts;

further defibering the removed incompletely defibered paper parts; and feeding the fibers which have been removed from the stock suspension together with the fibers obtained from the incompletely defibered paper parts as good stock for further processing into paper.

* * * * *